US011984245B2

(12) United States Patent
Enomoto et al.

(10) Patent No.: US 11,984,245 B2
(45) Date of Patent: May 14, 2024

(54) AMORPHOUS ALLOY SOFT MAGNETIC POWDER, DUST CORE, MAGNETIC ELEMENT, AND ELECTRONIC DEVICE

(71) Applicant: SEIKO EPSON CORPORATION, Tokyo (JP)

(72) Inventors: Takuma Enomoto, Hachinohe (JP); Kai Kitamura, Hachinohe (JP); Junya Abe, Hachinohe (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/580,377

(22) Filed: Jan. 20, 2022

(65) Prior Publication Data

US 2022/0230789 A1 Jul. 21, 2022

(51) Int. Cl.
*H01F 1/147* (2006.01)
*H01F 1/153* (2006.01)

(52) U.S. Cl.
CPC ....... *H01F 1/14766* (2013.01); *H01F 1/1535* (2013.01)

(58) Field of Classification Search
CPC ............. H01F 1/14766; H01F 1/15308; H01F 1/15333; H01F 1/153-15391
See application file for complete search history.

(56) References Cited

U.S. PATENT DOCUMENTS

| | | | | |
|---|---|---|---|---|
| 2010/0040503 | A1 | 2/2010 | Yoshizawa et al. | |
| 2010/0265028 | A1* | 10/2010 | McHenry | H01F 1/15333 148/621 |
| 2018/0301258 | A1* | 10/2018 | Kudo | H01F 1/15375 |
| 2019/0214171 | A1* | 7/2019 | Yoshidome | H01F 1/14708 |
| 2019/0283127 | A1 | 9/2019 | Kinouchi et al. | |
| 2020/0135369 | A1 | 4/2020 | Yoshidome et al. | |
| 2020/0357547 | A1* | 11/2020 | Harada | B22F 3/00 |
| 2022/0351884 | A1* | 11/2022 | Amano | C22C 38/00 |

FOREIGN PATENT DOCUMENTS

| | | | | |
|---|---|---|---|---|
| JP | 2006241569 A | 9/2006 | | |
| JP | 2020070468 A | 5/2020 | | |
| WO | WO-2021066056 A1 * | 4/2021 | | C22C 45/02 |

* cited by examiner

*Primary Examiner* — Anthony M Liang
*Assistant Examiner* — Danny N Kang
(74) *Attorney, Agent, or Firm* — CHIP LAW GROUP

(57) ABSTRACT

Provided is an amorphous alloy soft magnetic powder having a composition represented by the following formula: $(Fe_xCo_{(1-x)})_{(100-(a+b))}(Si_yB_{(1-y)})_aM_b$, [where M is at least one selected from the group consisting of C, S, P, Sn, Mo, Cu, and Nb, $0.73 \leq x \leq 0.85$, $0.02 \leq y \leq 0.10$, $13.0 \leq a \leq 19.0$, and $0 \leq b \leq 2.0$], in which a coercive force is 24 [A/m] or more (0.3 [Oe] or more) and 199 [A/m] or less (2.5 [Oe] or less), and a saturation magnetic flux density is 1.60 [T] or more and 2.20 [T] or less.

8 Claims, 6 Drawing Sheets

AMORPHOUS ALLOY SOFT MAGNETIC POWDER, DUST CORE, MAGNETIC ELEMENT, AND ELECTRONIC DEVICE

The present application is based on, and claims priority from JP Application Serial Number 2021-007205, filed Jan. 20, 2021, the disclosure of which is hereby incorporated by reference herein in its entirety.

BACKGROUND

1. Technical Field

The present disclosure relates to an amorphous alloy soft magnetic powder, a dust core, a magnetic element, and an electronic device.

2. Related Art

In order to reduce a size and increase an output of various electronic devices including a magnetic element, it is necessary to increase a saturation magnetic flux density of a soft magnetic powder contained in the dust core while maintaining a low coercive force.

JP-A-2020-070468 discloses a soft magnetic alloy powder containing a main component having a composition formula $(Fe_{(1-(\alpha+\beta))}X1_{\alpha}X2_{\beta})_{(1-(a+b+c+d+e+f))}M_aB_bP_cSi_dC_eS_f$, where X1 is one or more selected from the group consisting of Co and Ni, X2 is one or more selected from the group consisting of Al, Mn, Ag, Zn, Sn, As, Sb, Cu, Cr, Bi, N, O, and rare earth elements, and M is one or more selected from the group consisting of Nb, Hf, Zr, Ta, Mo, W, Ti, and V. In this powder, $0 \le a \le 0.160$, $0.020 \le b \le 0.200$, $0 \le c \le 0.150$, $0 \le d \le 0.060$, $0 \le e \le 0.030$, $0.0010 \le f \le 0.030$, $0.005 \le f/b \le 1.50$, $\alpha \ge 0$, $\beta \ge 0$, and $0 \le \alpha+\beta \le 0.50$. Further, JP-A-2020-070468 discloses that saturation magnetization after a heat treatment is improved by selecting Co as X1.

However, the soft magnetic alloy powder disclosed in JP-A-2020-070468 still has room for improvement in terms of increasing the saturation magnetization. That is, in the dust core, it is a problem to achieve both a low coercive force and a high saturation magnetic flux density.

SUMMARY

An amorphous alloy soft magnetic powder according to an application example of the present disclosure has a composition represented by the following formula:

$$(Fe_xCo_{(1-x)})_{(100-(a+b))}(Si_yB_{(1-y)})_aM_b$$

[where M is at least one selected from a group consisting of C, S, P, Sn, Mo, Cu, and Nb, $0.73 \le x \le 0.85$, $0.02 \le y \le 0.10$, $13.0 \le a \le 19.0$, and $0 \le b \le 2.0$], in which a coercive force is 24 [A/m] or more (0.3 [Oe] or more) and 199 [A/m] or less (2.5 [Oe] or less), and a saturation magnetic flux density is 1.60 [T] or more and 2.20 [T] or less.

A dust core according to an application example of the present disclosure contains: the amorphous alloy soft magnetic powder according to the application example of the present disclosure.

A magnetic element according to an application example of the present disclosure includes: the dust core according to the application example of the present disclosure.

An electronic device according to an application example of the present disclosure includes: the magnetic element according to the application example of the present disclosure.

DESCRIPTION OF EXEMPLARY EMBODIMENTS

Figure 1:
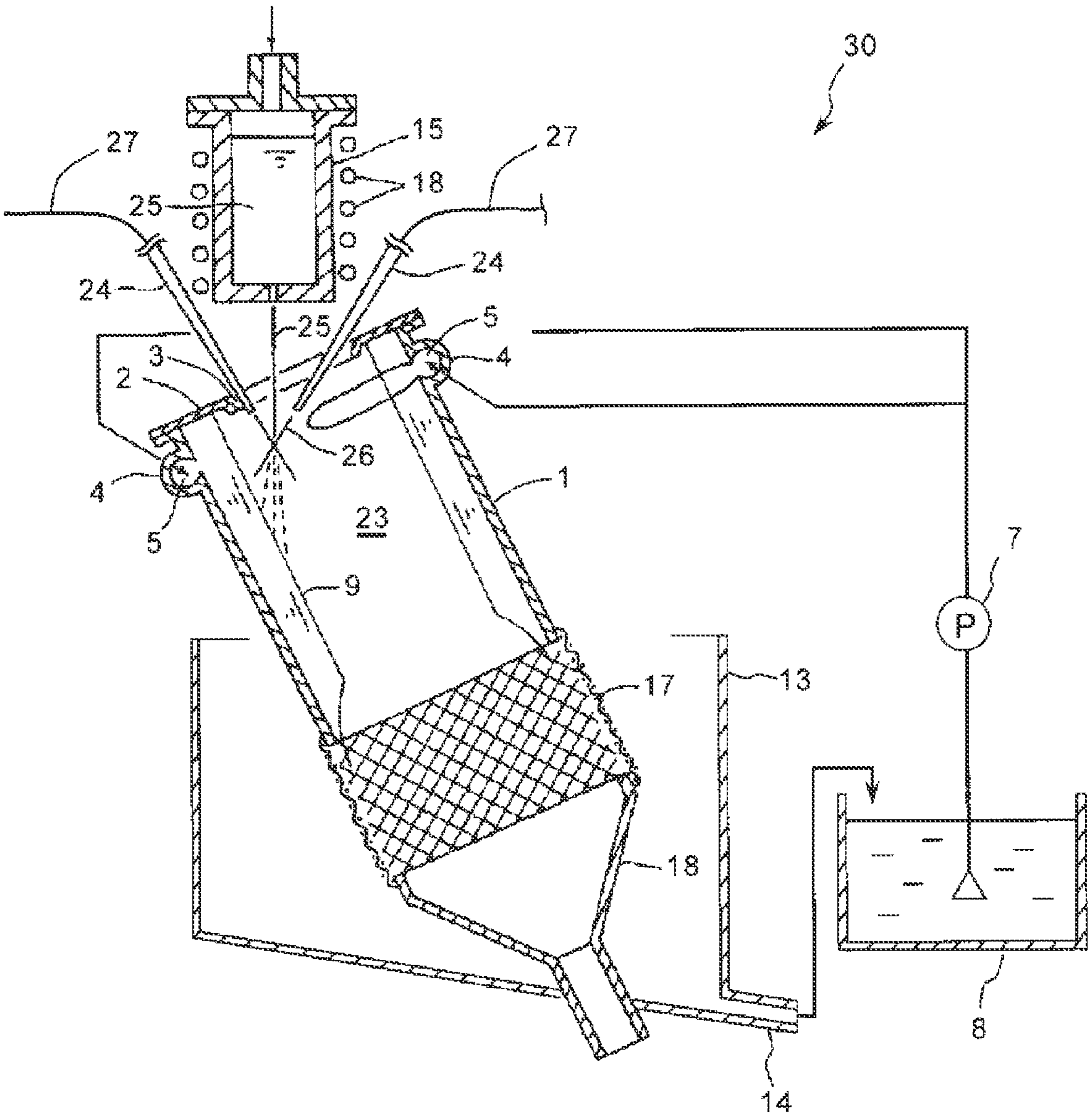
FIG. 1 is a longitudinal sectional view showing an example of a device that produces an amorphous alloy soft magnetic powder by a rotary water atomization method.

Hereinafter, an amorphous alloy soft magnetic powder, a dust core, a magnetic element, and an electronic device according to the present disclosure will be described in detail based on a preferred embodiment shown in the accompanying drawings.

1. Amorphous Alloy Soft Magnetic Powder

An amorphous alloy soft magnetic powder according to the embodiment is an amorphous alloy powder exhibiting soft magnetism. Such an amorphous alloy soft magnetic powder can be applied to any application utilizing soft magnetism, and for example, a dust core can be obtained by binding particles to each other and molding the particles.

The amorphous alloy soft magnetic powder according to the embodiment is a powder having a composition represented by $(Fe_xCo_{(1-x)})_{(100-(a+b))}(Si_yB_{(1-y)})_aM_b$. Here, M is at least one selected from the group consisting of C, S, P, Sn, Mo, Cu, and Nb. x, y, a, and b are numerical values representing atomic % in the composition formula, $0.73 \le x \le 0.85$, $0.02 \le y \le 0.10$, $13.0 \le a \le 19.0$, and $0 \le b \le 2.0$. Further, the amorphous alloy soft magnetic powder has a coercive force of 24 [A/m] or more (0.3 [Oe] or more) and 199 [A/m] or less (2.5 [Oe] or less) and a saturation magnetic flux density of 1.60 [T] or more and 2.20 [T] or less.

Such an amorphous alloy soft magnetic powder achieves both a low coercive force and a high saturation magnetic flux density. Therefore, by using the amorphous alloy soft magnetic powder, a size of the magnetic element can be reduced and an output thereof can be increased.

Hereinafter, the composition of the amorphous alloy soft magnetic powder according to the embodiment will be described in detail.

Fe (iron) has a great influence on basic magnetic properties and mechanical properties of the amorphous alloy soft magnetic powder according to the embodiment.

A content of Fe is not particularly limited, and is set such that Fe is a main component, that is, a ratio of the number of atoms is highest in the amorphous alloy soft magnetic powder.

In the amorphous alloy soft magnetic powder according to the present embodiment, $61.0 \leq x(100-(a+b)) \leq 71.0$ is preferable, $63.0 \leq x(100-(a+b)) \leq 69.0$ is more preferable, and $65.0 \leq x(100-(a+b)) \leq 68.0$ is still more preferable. When the content of Fe is less than the lower limit value described above, a magnetic flux density of the amorphous alloy soft magnetic powder may decrease depending on the compositions. Meanwhile, when the content of Fe is more than the upper limit value described above, it may be difficult to stably form an amorphous structure depending on the compositions.

x represents a ratio of the number of Fe atoms to the total number of atoms when a sum of the number of Fe atoms and the number of Co atoms is 1. In the amorphous alloy soft magnetic powder according to the present embodiment, $0.73 \leq x \leq 0.85$. Further, $0.75 \leq x \leq 0.83$ is preferable, and $0.77 \leq x \leq 0.81$ is more preferable.

Co (cobalt) can increase the saturation magnetic flux density of the amorphous alloy soft magnetic powder.

When the sum of the number of Fe atoms and the number of Co atoms is 1, a ratio of the number of Co atoms to the total number of atoms is $0.15 \leq 1-x \leq 0.27$. Further, $0.17 \leq 1-x \leq 0.25$ is preferable, and $0.19 \leq 1-x \leq 0.23$ is more preferable. When 1−x is within the ranges described above, the saturation magnetic flux density of the amorphous alloy soft magnetic powder can be increased while reducing an increase in coercive force.

When 1−x is less than the lower limit value described above, the content of Co to the content of Fe is too small, so that the saturation magnetic flux density cannot be sufficiently increased. Meanwhile, when 1−x is more than the upper limit value described above, the content of Co to the content of Fe is too large, so that it is difficult to stably form the amorphous structure, and the coercive force increases.

The content of Co is preferably 12.0 atomic % or more and 22.0 atomic % or less, and more preferably 15.0 atomic % or more and 19.0 atomic % or less.

Si (silicon) promotes amorphization and increases magnetic permeability of the amorphous alloy soft magnetic powder when the amorphous alloy soft magnetic powder is produced from a raw material. Accordingly, a low coercive force and a high magnetic permeability can be achieved.

B (boron) promotes the amorphization when the amorphous alloy soft magnetic powder is produced from a raw material. In particular, by using Si and B in combination, the amorphization can be synergistically promoted based on a difference in an atomic radius between Si and B. Accordingly, a low coercive force and a high magnetic permeability can be achieved.

y represents a ratio of the number of Si atoms to the total number of atoms when a sum of the number of Si atoms and the number of B atoms is 1. In the amorphous alloy soft magnetic powder according to the present embodiment, $0.02 \leq y \leq 0.10$. Further, $0.04 \leq y \leq 0.08$ is preferable, and $0.05 \leq y \leq 0.07$ is more preferable. By setting y within the ranges described above, a balance between the number of Si atoms and the number of B atoms can be optimized. Accordingly, even when Fe and Co have relatively high concentrations, the amorphization can be sufficiently achieved. Therefore, by setting y within the ranges described above, the saturation magnetic flux density can be particularly increased without impairing a low coercive force.

When y is less than the lower limit value described above and when y is more than the upper limit value described above, the balance between the number of Si atoms and the number of B atoms is lost. Therefore, the amorphization cannot be promoted at a composition ratio in which Fe and Co have relatively high concentrations.

a determines a balance between Si, B and Fe, Co. In the amorphous alloy soft magnetic powder according to the present embodiment, $13.0 \leq a \leq 19.0$. Further, $14.0 \leq a \leq 18.0$ is preferable, and $15.0 \leq a \leq 17.0$ is more preferable. When a is within the ranges described above, the balance between Si, B, which mainly promote the amorphization, and Fe, Co, which mainly increase the saturation magnetic flux density, is optimized.

When a is less than the lower limit value described above, an amount ratio of Si and B decreases, and an amount ratio of Fe and Co increases, so that the amorphization is difficult. Meanwhile, when a is more the upper limit value described above, the amount ratio of Si and B increases, and the amount ratio of Fe and Co decreases, so that it is difficult to sufficiently increase the saturation magnetic flux density.

A content of Si is preferably 0.40 atomic % or more and 1.80 atomic % or less, and more preferably 0.80 atomic % or more and 1.50 atomic % or less.

A content of B is preferably 11.0 atomic % or more and 18.0 atomic % or less, and more preferably 14.0 atomic % or more and 16.0 atomic % or less.

M is at least one selected from the group consisting of C, S, P, Sn, Mo, Cu, and Nb. By containing a predetermined amount of M, the saturation magnetic flux density can be further increased. Further, when M includes two or more of the above elements, the saturation magnetic flux density can be further increased as compared to a case in which M is not contained or a case in which one type of M is contained.

b represents the content of M. When a plurality of elements are contained as M, b is a total content of the plurality of elements. In the amorphous alloy soft magnetic powder according to the present embodiment, $0 \leq b \leq 2.0$. Further, $0.5 \leq b \leq 1.5$ is preferable, and $0.7 \leq b \leq 1.2$ is more preferable. When b is within the ranges described above, the saturation magnetic flux density can be increased without inhibiting the amorphization.

When b is less than the lower limit value described above, the effect described above may not be sufficiently obtained. Meanwhile, when b is more than the upper limit value described above, the amorphization is inhibited.

The amorphous alloy soft magnetic powder according to the embodiment may contain impurities in addition to the composition represented by $(Fe_xCo_{(1-x)})_{(100-(a+b))}(Si_yB_{(1-y)})_aM_b$. Examples of the impurities include all elements other than the above elements, a total content of the impurities is preferably 0.2 mass % or less, and more preferably 0.1 mass % or less.

The composition of the amorphous alloy soft magnetic powder according to the embodiment is described in detail above, and the composition and the impurities are specified by the following analysis method.

Examples of the analysis method include iron and steel-atomic absorption spectrometry defined in JIS G1257:2000, iron and steel-ICP emission spectrometry defined in JIS G1258:2007, iron and steel-spark discharge emission spectrometry defined in JIS G1253:2002, iron and steel-fluorescent X-ray spectrometry defined in JIS G1256:1997, and weight, titration, and absorbance spectrometry defined in JIS G1211 to G1237.

Specific examples thereof include a solid emission spectrometer manufactured by SPECTRO, in particular, a spark discharge emission spectrometer whose model is SPECTROLAB and type is LAVMB08A, or ICP apparatus CIROS120 type manufactured by Rigaku Corporation.

In particular, when C (carbon) and S (sulfur) are to be specified, an oxygen gas flow combustion (high-frequency induction furnace combustion)—infrared absorption method defined in JIS G1211:2011 is also used. Specific examples thereof include a carbon-sulfur analyzer CS-200 manufactured by LECO Corporation.

In particular, when N (nitrogen) and O (oxygen) are to be specified, general rules of an iron and steel-nitrogen quantification method defined in JIS G1228:1997 and a metal material oxygen quantification method defined in JIS Z2613:2006 are also used. Specific examples thereof include an oxygen-nitrogen analyzer, TC-300/EF-300 manufactured by LECO Corporation.

A degree of the amorphization in the amorphous alloy soft magnetic powder can be specified based on a crystallinity. The crystallinity of the amorphous alloy soft magnetic powder is calculated based on a spectrum obtained by X-ray diffraction of the amorphous alloy soft magnetic powder based on the following equation. Crystallinity={crystal-derived intensity/(crystal-derived intensity+amorphous-derived intensity)}×100

As an X-ray diffractometer, for example, RINT2500V/PC manufactured by Rigaku Corporation is used.

The crystallinity measured by such a method is preferably 70% or less, and more preferably 60% or less. Accordingly, the improvement of the soft magnetism along with the amorphization is more remarkable. As a result, an amorphous alloy soft magnetic powder having a sufficiently low coercive force is obtained. In other words, it is preferable that the amorphous alloy soft magnetic powder is entirely amorphized, and may contain a crystal structure at a volume ratio of, for example, 70% or less.

An average particle diameter D50 of the amorphous alloy soft magnetic powder is not particularly limited, and is preferably 5.0 μm or more and 60.0 μm or less, more preferably 10.0 μm or more and 50.0 μm or less, and still more preferably 20.0 μm or more and 40.0 μm or less. By using the amorphous alloy soft magnetic powder having such an average particle diameter, a high powder compacting density can be obtained. As a result, a packing density of the dust core can be increased, and a high saturation magnetic flux density and a high magnetic permeability of the dust core can be obtained.

The average particle diameter D50 of the amorphous alloy soft magnetic powder is determined as a particle diameter when a cumulative value is 50% from a small diameter side in a mass-based particle size distribution obtained by a laser diffraction method.

When the average particle diameter of the amorphous alloy soft magnetic powder is less than the lower limit value described above, since the particle diameter is too small, the crystallinity may not be sufficiently lowered. Meanwhile, when the average particle diameter of the amorphous alloy soft magnetic powder is more than the upper limit value described above, since the particle diameter is too large, a filling property during compacting may decrease.

Further, in the mass-based particle size distribution of the amorphous alloy soft magnetic powder obtained by the laser diffraction method, when a particle diameter when the cumulative value is 10% from the small diameter side is defined as D10 and a particle diameter when the cumulative value is 90% from the small diameter side is defined as D90, (D90-D10) /D50 is preferably about 1.5 or more and 3.5 or less, and more preferably about 2.0 or more and 3.0 or less. (D90-D10)/D50 is an index indicating a degree of expansion of the particle size distribution, and when this index is within the ranges described above, the filling property of the amorphous alloy soft magnetic powder is particularly good. Accordingly, an amorphous alloy soft magnetic powder enabling production of a dust core having a particularly high saturation magnetic flux density is obtained.

The coercive force of the amorphous alloy soft magnetic powder according to the embodiment is 24 [A/m] or more (0.3 [Oe] or more) and 199. [A/m] or less (2.5 [Oe] or less), preferably 40 [A/m] or more (0.5 [Oe] or more) and 175 [A/m] or less (2.2 [Oe] or less), and more preferably 56 [A/m] or more (0.7 [Oe] or more) and 159 [A/m] or less (2.0 [Oe] or less).

By using an amorphous alloy soft magnetic powder having such a relatively small coercive force, a dust core capable of sufficiently reducing a hysteresis loss can be produced even at a high frequency.

When the coercive force is less than the lower limit value described above, it is difficult to stably produce such an amorphous alloy soft magnetic powder having the low coercive force. When the coercive force is pursued too much, the saturation magnetic flux density is influenced and the saturation magnetic flux density decreases. Meanwhile, when the coercive force is more than the upper limit value described above, since the hysteresis loss is increased at a high frequency, an iron loss of the dust core is increased.

The coercive force of the amorphous alloy soft magnetic powder can be measured, for example, by using a vibrating sample magnetometer such as TM-VSM1230-MHHL manufactured by Tamakawa Co., Ltd.

The saturation magnetic flux density of the amorphous alloy soft magnetic powder according to the embodiment is 1.60 [T] or more and 2.20 [T] or less, preferably 1.60 [T] or more and 2.10 [T] or less, and more preferably 1.65 [T] or more and 2.00 [T] or less.

By using an amorphous alloy soft magnetic powder having such a relatively high saturation magnetic flux density, a dust core having a high saturation magnetic flux density can be obtained. According to such a dust core, the size of the magnetic element can be reduced and the output thereof can be increased.

When the saturation magnetic flux density is less than the lower limit value described above, it is difficult to reduce the size of the magnetic element and increase the output thereof. Meanwhile, when the saturation magnetic flux density is more than the upper limit value described above, it is difficult to stably produce an amorphous alloy soft magnetic powder having such a saturation magnetic flux density. When the saturation magnetic flux density is pursued too much, the coercive force is influenced and the coercive force increases.

The saturation magnetic flux density of the amorphous alloy soft magnetic powder can be measured, for example, by forming a dust core into a toroidal shape and using a B-H analyzer such as a DC B-H analyzer or BH-5501 manufactured by Denshijiki Industry Co.,Ltd. The number of turns of exciting coil is, for example, 169 turns for a primary coil and 169 turns for a secondary coil. Further, the number of turns can be obtained by calculation based on maximum magnetization by a method to be described later.

The magnetic permeability of the amorphous alloy soft magnetic powder according to the embodiment at a measurement frequency of 100 kHz is preferably 20.0 or more, and more preferably 21.0 or more. Even when a high magnetic field is applied, such an amorphous alloy soft magnetic powder contributes to implementation of a dust core and a magnetic element in which the magnetic flux density is less likely to be saturated, that is, the saturation magnetic flux density is high. An upper limit value of the magnetic permeability is not particularly limited, and is 50.0 in consideration of stable production.

The magnetic permeability of the amorphous alloy soft magnetic powder is, for example, a relative magnetic permeability obtained based on a self-inductance of a closed magnetic circuit magnetic core coil in which the dust core has a toroidal shape, that is, an effective magnetic permeability. For measurement of the magnetic permeability, for example, an impedance analyzer such as 4194A manufactured by Agilent Technologies, Inc. is used, and the measurement frequency is set to 1 MHz. Further, the number of turns of the exciting coil is seven, and a wire diameter of a winding is 0.5 mm.

In the amorphous alloy soft magnetic powder, the apparent density and the tap density are preferably within predetermined ranges. Specifically, when the apparent density [g/cm$^3$] of the amorphous alloy soft magnetic powder is 100, the tap density [g/cm$^3$] is preferably 103 or more and 120 or less, more preferably 105 or more and 115 or less, and still more preferably 107 or more and 113 or less. It can be said that such an amorphous alloy soft magnetic powder is relatively difficult for filling when not tapped (vibrated), and is easy for filling when tapped. Based on this fact, when the tap density is within the ranges described above, it can be said that the powder has a particle distribution in which the number of irregularly shaped particles is relatively small and the filling property is high. Such an amorphous alloy soft magnetic powder can be made into a dust core having a high density, and therefore, the saturation magnetic flux densities of the dust core and the magnetic element can be particularly increased.

The apparent density of the amorphous alloy soft magnetic powder is preferably 4.55 [g/cm$^3$] or more and 4.80 [g/cm$^3$] or less, and more preferably 4.58 [g/cm$^3$] or more and 4.70 [g/cm$^3$] or less.

The tap density of the amorphous alloy soft magnetic powder is preferably 4.95 [g/cm$^3$] or more and 5.30 [g/cm$^3$] or less, and more preferably 5.00 [g/cm$^3$] or more and 5.20 [g/cm$^3$] or less.

When the apparent density and the tap density of the amorphous alloy soft magnetic powder are within the ranges described above, the saturation magnetic flux densities of the dust core and the magnetic element can be particularly increased.

When a relative value of the tap density is less than the lower limit value described above, the filling property of the amorphous alloy soft magnetic powder may decrease in the case of compacting the amorphous alloy soft magnetic powder to obtain a dust core. Meanwhile, when the relative value of the tap density is more than the upper limit value described above, a shrinkage ratio may increase in the case of compacting the amorphous alloy soft magnetic powder to obtain a dust core. Therefore, the dust core is likely to be deformed, and a dimensional accuracy may be reduced.

The apparent density of the amorphous alloy soft magnetic powder is measured in accordance with a metal powder-apparent density measurement method specified in JIS Z2504:2012, and the unit thereof is g/cm$^3$.

The tap density of the amorphous alloy soft magnetic powder is measured in accordance with a metal powder-tap density measurement method specified in JIS Z2512:2012, and the unit thereof is g/cm$^3$.

2. Method for Producing Amorphous Alloy Soft Magnetic Powder

Next, a method for producing an amorphous alloy soft magnetic powder will be described.

The amorphous alloy soft magnetic powder may be produced by any production method, and is produced by, for example, an atomization method such as a water atomization method, a gas atomization method, or a rotary water atomization method, or various powdering methods such as a reduction method, a carbonyl method, or a pulverization method.

Examples of the atomization method include a water atomization method, a gas atomization method, and a rotary water atomization method, depending on the type of a cooling medium and a device configuration. Among these methods, the amorphous alloy soft magnetic powder is preferably produced by the atomization method, more preferably produced by the water atomization method or the rotary water atomization method, and still more preferably produced by the rotary water atomization method. The atomization method is a method of producing a powder by pulverizing and cooling a molten raw material by colliding the molten raw material with a fluid such as a liquid or gas injected at a high speed. By using such an atomization method, an amorphous alloy soft magnetic powder having good amorphization and a good filling property can be efficiently produced.

In the present specification, the "water atomization method" refers to a method in which a liquid such as water or oil is used as a cooling liquid, and in a state where the liquid is injected in an inverted conical shape converging into one point, a molten metal is flowed down toward the convergence point and collides with the convergence point, thereby producing a metal powder.

Meanwhile, according to the rotary water atomization method, since the molten metal can be cooled at an extremely high speed, the amorphization is particularly easily achieved.

When the amorphous alloy soft magnetic powder is to be produced, a cooling speed of the molten metal is preferably more than $10^6$ [K/sec], and more preferably $10^7$ [K/sec] or more. Accordingly, an amorphous alloy soft magnetic powder with sufficient amorphization is obtained. That is, even when the composition has a relatively high content of Fe or Co, the amorphization can be achieved. In particular, according to the rotary water atomization method, a cooling speed of $10^7$ [K/sec] or more can be easily implemented.

Hereinafter, the method for producing the amorphous alloy soft magnetic powder by using the rotary water atomization method will be further described.

In the rotary water atomization method, a cooling liquid layer is formed on an inner circumferential surface of a cooling cylinder by ejecting and supplying a cooling liquid along the inner circumferential surface and swirling the cooling liquid along the inner circumferential surface of the cooling cylinder. Meanwhile, a raw material of an amorphous alloy soft magnetic powder is melted, and a liquid or gas jet is sprayed to the obtained molten metal while the melted metal naturally drops. When the molten metal is scattered in this way, the scattered molten metal is taken into the cooling liquid layer. As a result, the dispersed and pulverized molten metal is rapidly cooled and solidified, and an amorphous alloy soft magnetic powder is obtained.

FIG. 1 is a longitudinal sectional view showing an example of a device that produces the amorphous alloy soft magnetic powder by the rotary water atomization method.

A powder production device 30 shown in FIG. 1 includes a cooling cylinder 1, a crucible 15, a pump 7, and a jet nozzle 24. The cooling cylinder 1 is a cylinder for forming a cooling liquid layer 9 on an inner circumferential surface thereof. The crucible 15 is a supply container for supplying a molten metal 25 to a space 23 inside the cooling liquid layer 9. The pump 7 supplies the cooling liquid to the cooling cylinder 1. The jet nozzle 24 ejects a gas jet 26 for dividing the flowing flow-shaped molten metal 25 into droplets.

The molten metal 25 is prepared according to the composition of the amorphous alloy soft magnetic powder.

The cooling cylinder 1 has a cylindrical shape, and is provided such that a cylinder axis line extends along a vertical direction or is inclined at an angle of 30° or less with respect to the vertical direction.

An upper end opening of the cooling cylinder 1 is closed by a lid body 2. An opening 3 for supplying the molten metal 25 flowing down to the space 23 of the cooling cylinder 1 is formed in the lid body 2.

A cooling liquid ejection pipe 4 for ejecting the cooling liquid to the inner circumferential surface of the cooling cylinder 1 is provided in an upper portion of the cooling cylinder 1. A plurality of discharge ports 5 of the cooling liquid ejection pipe 4 are provided at equal intervals along a circumferential direction of the cooling cylinder 1.

The cooling liquid ejection pipe 4 is coupled to a tank 8 via a pipe to which the pump 7 is coupled, and the cooling liquid in the tank 8 suctioned by the pump 7 is ejected and supplied into the cooling cylinder 1 via the cooling liquid ejection pipe 4. Accordingly, the cooling liquid gradually flows down while rotating along the inner circumferential surface of the cooling cylinder 1, and accordingly, the cooling liquid layer 9 along the inner circumferential surface is formed. A cooler may be interposed in the tank 8 or in a middle of a circulation flow path as necessary. As the cooling liquid, in addition to water, oil such as silicone oil is used, and various additives may be further added thereto. Further, by removing dissolved oxygen in the cooling liquid in advance, oxidation of the produced powder can be reduced.

Further, a cylindrical liquid draining mesh body 17 is continuously provided at a lower portion of the cooling cylinder 1, and a funnel-shaped powder recovery container 18 is provided below the liquid draining mesh body 17. A cooling liquid recovery cover 13 is provided around the liquid draining mesh body 17 so as to cover the liquid draining mesh body 17, and a drain port 14 formed in a bottom portion of the cooling liquid recovery cover 13 is coupled to the tank 8 via a pipe.

The jet nozzle 24 is provided in the space 23. The jet nozzle 24 is attached to a tip end of a gas supply pipe 27 inserted through the opening 3 of the lid body 2, and an ejection port of the jet nozzle 24 is disposed so as to be directed to the flow-shaped molten metal 25.

In order to produce the amorphous alloy soft magnetic powder in such a powder production device 30, first, the pump 7 is operated to form the cooling liquid layer 9 on the inner circumferential surface of the cooling cylinder 1. Next, the molten metal 25 in the crucible 15 is flowed down into the space 23. When the gas jet 26 is sprayed to the molten metal 25 flowing down, the molten metal 25 is scattered, and the pulverized molten metal 25 is caught in the cooling liquid layer 9. As a result, the pulverized molten metal 25 is cooled and solidified, and the amorphous alloy soft magnetic powder is obtained.

In the rotary water atomization method, since an extremely high cooling speed can be stably maintained by continuously supplying the cooling liquid, the amorphization of the produced amorphous alloy soft magnetic powder is promoted.

Further, since the molten metal 25 pulverized to a certain size by the gas jet 26 falls due to inertia until the molten metal 25 is caught in the cooling liquid layer 9, the droplets are made spherical at that time. As a result, an amorphous alloy soft magnetic powder having a good particle size distribution and an excellent filling property can be produced.

For example, a flow-down amount of the molten metal 25 flowing down from the crucible 15 varies depending on a device size and the like, and is preferably more than 1.0 [kg/min] and 20.0 [kg/min] or less, and more preferably 2.0 [kg/min] or more and 10.0 [kg/min] or less. Accordingly, since an amount of the molten metal 25 flowing down for a certain period of time can be optimized, an amorphous alloy soft magnetic powder with sufficient amorphization can be efficiently produced.

A pressure of the gas jet 26 slightly varies depending on a configuration of the jet nozzle 24, and is preferably 2.0 MPa or more and 20.0 MPa or less, and more preferably 3.0 MPa or more and 10.0 MPa or less. Accordingly, a particle diameter when the molten metal 25 is scattered can be optimized, and an amorphous alloy soft magnetic powder with sufficient amorphization can be produced. That is, when the pressure of the gas jet 26 is less than the lower limit value described above, it is difficult to scatter the molten metal 25 in a sufficiently fine way, and the particle diameter is likely to increase. As a result, the cooling speed of an inside of the droplet decreases, and the amorphization may be insufficient. Meanwhile, when the pressure of the gas jet 26 is more than the upper limit value described above, the particle diameter of the droplets after the scattering may be too small. As a result, the droplets are slowly cooled by the gas jet 26, and rapid cooling by the cooling liquid layer 9 may not be performed, which may result in insufficient amorphization.

Further, a flow rate of the gas jet 26 is not particularly limited, and is preferably 1.0 [$Nm^3$/min] or more and 20.0 [$Nm^3$/min] or less.

A pressure during the ejection of the cooling liquid supplied to the cooling cylinder 1 is preferably about 5 MPa or more and 200 MPa or less, and more preferably about 10 MPa or more and 100 MPa or less. Accordingly, a flow speed in the cooling liquid layer 9 is optimized, and the pulverized molten metal 25 is less likely to have an irregular shape. As a result, an amorphous alloy soft magnetic powder having a more excellent filling property can be obtained. Further, the cooling speed of the molten metal 25 by the cooling liquid can be sufficiently increased.

As described above, the amorphous alloy soft magnetic powder is obtained.

The particle diameter of the amorphous alloy soft magnetic powder can be reduced by, for example, performing operations such as reduction of the flow-down amount of the molten metal 25 flowing down from the crucible 15, increase of the pressure of the gas jet 26, and increase of the flow rate of the gas jet 26. Further, by performing operations opposite to the above operations, the particle diameter can be increased.

The particle size distribution of the amorphous alloy soft magnetic powder can be narrowed by, for example, setting the flow-down amount of the molten metal 25, and the pressure and flow rate of the gas jet 26 within the ranges described above. With this setting, a ratio of the tap density to the apparent density of the amorphous alloy soft magnetic powder can be increased.

The produced amorphous alloy soft magnetic powder may be subjected to a heat treatment as necessary. As conditions of the heat treatment, for example, a heating temperature is set to 200° C. or higher and 500° C. or lower, and a holding time at this temperature is set to 5 minutes or longer and 2 hours or shorter. Further, examples of a heat treatment atmosphere include an inert gas atmosphere such as nitrogen and argon, a reducing gas atmosphere such as hydrogen and ammonia decomposition gas, or reduced-pressure atmospheres thereof.

The amorphous alloy soft magnetic powder may be subjected to a classification treatment as necessary. Examples of the classification method include dry classification such as sieving classification, inertial classification, centrifugal classification, and wind classification, and wet classification such as sedimentation classification.

An insulating film may be formed on a surface of each particle of the obtained soft magnetic powder as necessary. Examples of a constituent material of the insulating film include inorganic materials such as phosphates such as magnesium phosphate, calcium phosphate, zinc phosphate, manganese phosphate, and cadmium phosphate, and silicates such as sodium silicate.

3. Dust Core and Magnetic Element

Next, a dust core and a magnetic element according to the embodiment will be described.

The magnetic element according to the embodiment can be applied to various magnetic elements including a magnetic core, such as a choke coil, an inductor, a noise filter, a reactor, a transformer, a motor, an actuator, an electromagnetic valve, and a generator. Further, the dust core according to the embodiment is applicable to the magnetic core included in these magnetic elements.

Hereinafter, two types of coil components will be representatively described as an example of the magnetic element.

3.1. Toroidal Type

First, a toroidal type coil component serving as the magnetic element according to the embodiment will be described.

Figure 2:
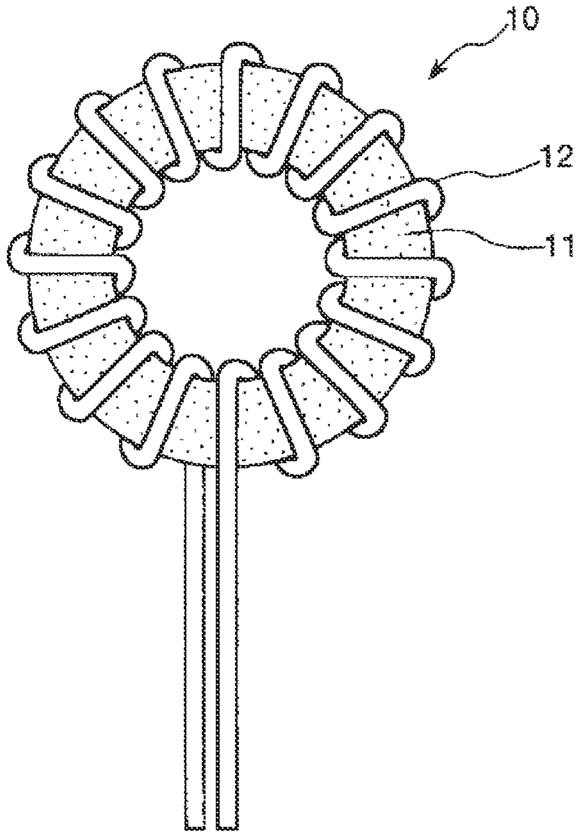
FIG. 2 is a plan view schematically showing a toroidal type coil component.

FIG. 2 is a plan view schematically showing the toroidal type coil component. A coil component 10 shown in FIG. 2 includes a ring-shaped dust core 11 and a conductive wire 12 wound around the dust core 11.

The dust core 11 is obtained by mixing the above-described amorphous alloy soft magnetic powder and a binder, supplying the obtained mixture to a mold, and pressing and molding the mixture. That is, the dust core 11 is a powder compact containing the amorphous alloy soft magnetic powder according to the embodiment. Such a dust core 11 has a high saturation magnetic flux density and a low coercive force. Therefore, when the coil component 10 including the dust core 11 is mounted on an electronic device, power consumption of the electronic device can be reduced, a size of the electronic device can be reduced and an output thereof can be increased.

The coil component 10 includes such a dust core 11. Such a coil component 10 contributes to the reduction in size and the increase in output of the electronic device.

Examples of a constituent material of the binder used in the production of the dust core 11 include: organic materials such as silicone-based resins, epoxy-based resins, phenol-based resins, polyamide-based resins, polyimide-based resins, and polyphenylene sulfide-based resins; and inorganic materials such as phosphates such as magnesium phosphate, calcium phosphate, zinc phosphate, manganese phosphate, and cadmium phosphate, and silicates such as sodium silicate.

Examples of a constituent material of the conductive wire 12 include a material having high conductivity, for example, a metal material containing Cu, Al, Ag, Au, Ni, or the like. Further, an insulating film is provided on a surface of the conductive wire 12 as necessary.

A shape of the dust core 11 is not limited to the ring shape shown in FIG. 2, and may be, for example, a shape in which a part of the ring is missing, or a shape in which the shape in a longitudinal direction is linear.

The dust core 11 may contain a soft magnetic powder or a non-magnetic powder other than the amorphous alloy soft magnetic powder according to the embodiment described above as necessary.

3.2. Closed Magnetic Circuit Type

Next, a closed magnetic circuit type coil component serving as the magnetic element according to the embodiment will be described.

Figure 3:
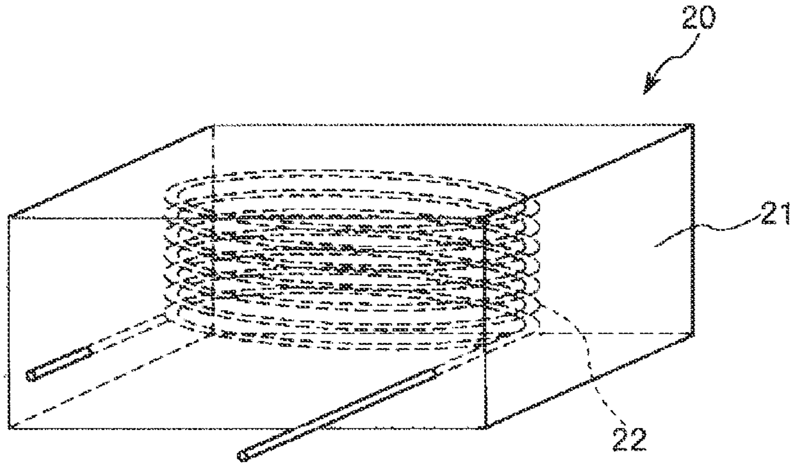
FIG. 3 is a transparent perspective view schematically showing a closed magnetic circuit type coil component.

FIG. 3 is a transparent perspective view schematically showing the closed magnetic circuit type coil component.

Hereinafter, the closed magnetic circuit type coil component will be described. In the following description, differences from the toroidal type coil component will be mainly described, and description of the same matters will be omitted.

A coil component 20 shown in FIG. 3 includes a chip-shaped dust core 21, and a conductive wire 22 embedded in the dust core 21 and formed into a coil shape. That is, the dust core 21 is a powder compact containing the amorphous alloy soft magnetic powder according to the embodiment. Such a dust core 21 has a high saturation magnetic flux density and a low coercive force.

The coil component 20 includes such a dust core 21. Such a coil component 20 contributes to a reduction in size and an increase in output of an electronic device.

The dust core 21 may contain a soft magnetic powder or a non-magnetic powder other than the amorphous alloy soft magnetic powder according to the embodiment described above as necessary.

4. Electronic Device

Next, an electronic device including the magnetic element according to the embodiment will be described with reference to FIGS. 4 to 6.

Figure 4:
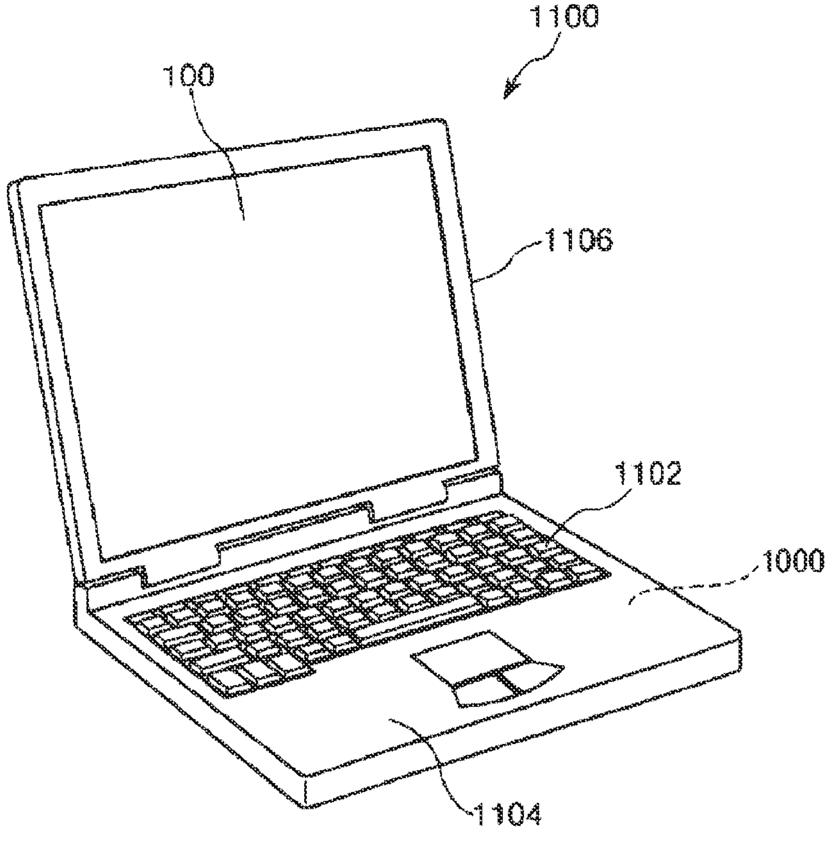
FIG. 4 is a perspective view showing a mobile personal computer serving as an electronic device including a magnetic element according to an embodiment.

FIG. 4 is a perspective view showing a mobile personal computer that is an electronic device including the magnetic element according to the embodiment. A personal computer 1100 shown in FIG. 4 includes a main body 1104 including a keyboard 1102, and a display unit 1106 including a display 100. The display unit 1106 is rotatably supported by the main body 1104 via a hinge structure. Such a personal computer 1100 includes a built-in magnetic element 1000 such as a choke coil for a switching power supply, an inductor, and a motor.

Figure 5:
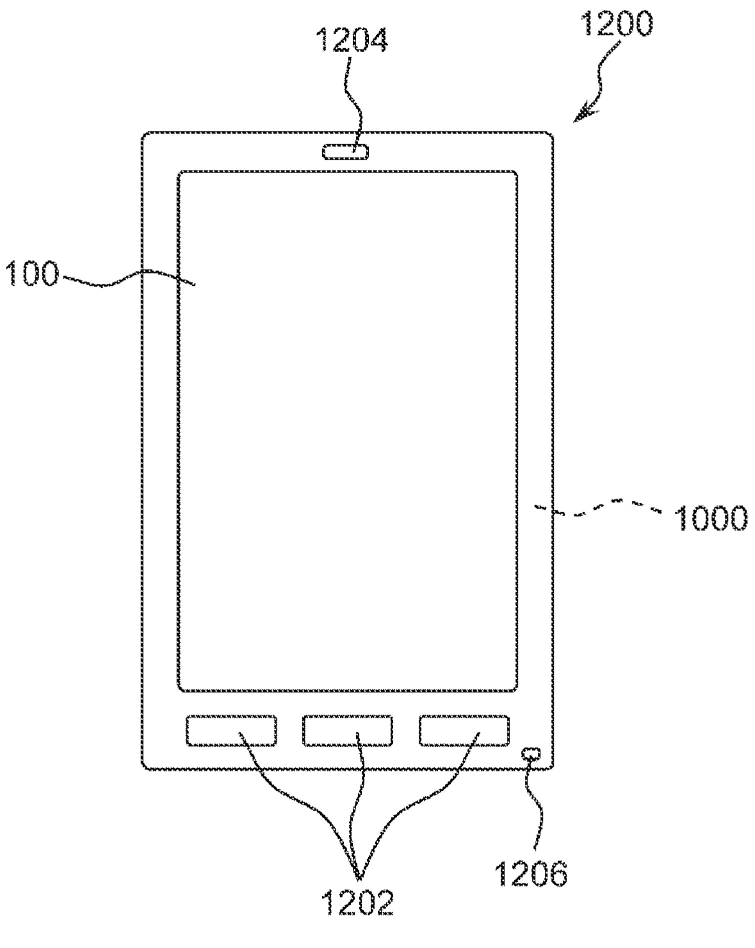
FIG. 5 is a plan view showing a smartphone serving as the electronic device including the magnetic element according to the embodiment.

FIG. 5 is a plan view showing a smartphone serving as the electronic device including the magnetic element according to the embodiment. A smartphone 1200 shown in FIG. 5 includes a plurality of operation buttons 1202, an earpiece 1204, and a mouthpiece 1206. Further, a display 100 is disposed between the operation buttons 1202 and the earpiece 1204. The smartphone 1200 includes the built-in magnetic element 1000 such as an inductor, a noise filter, and a motor.

Figure 6:
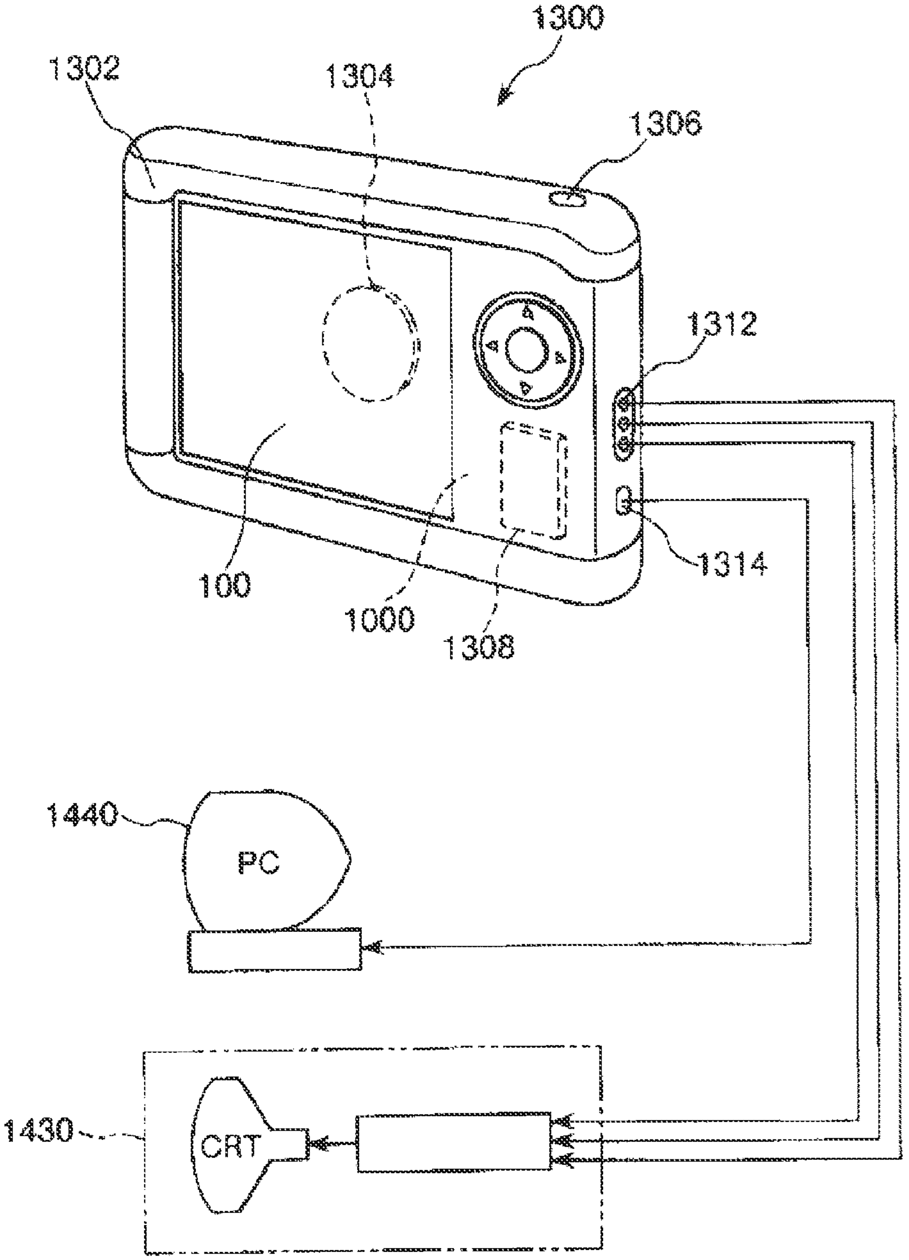
FIG. 6 is a perspective view showing a digital still camera serving as the electronic device including the magnetic element according to the embodiment.

FIG. 6 is a perspective view showing a digital still camera serving as the electronic device including the magnetic element according to the embodiment. In FIG. 6, connection with an external device is also shown in a simplified manner. A digital still camera 1300 photoelectrically converts an optical image of a subject by an imaging element such as a charge coupled device (CCD) to generate an imaging signal.

The digital still camera 1300 shown in FIG. 6 includes a display 100 provided on a rear surface of a case 1302. The display 100 functions as a finder that displays the subject as an electronic image. Further, a light receiving unit 1304 including an optical lens, a CCD, and the like is provided on a front surface side of the case 1302, that is, on a back surface side in the drawing.

When a photographer confirms an image of the subject displayed on the display 100 and presses a shutter button 1306, the imaging signal of the CCD at that time is transferred to and stored in a memory 1308. Further, in the digital still camera 1300, a video signal output terminal 1312 and a data communication input and output terminal 1314 are provided on a side surface of the case 1302. As shown in the drawing, a television monitor 1430 is coupled to the video signal output terminal 1312, and a personal computer 1440 is coupled to the data communication input and output terminal 1314, as necessary. Further, the imaging signal stored in the memory 1308 is output to the television monitor 1430 or the personal computer 1440 by a predetermined operation. The digital still camera 1300 also includes the built-in magnetic element 1000 such as an inductor, and a noise filter.

In addition to the personal computer shown in FIG. 4, the smartphone shown in FIG. 5, and the digital still camera shown in FIG. 6, examples of the electronic device according to the embodiment include a mobile phone, a tablet terminal, a watch, inkjet ejection devices such as an inkjet printer, a laptop personal computer, a television, a video camera, a video tape recorder, a car navigation device, a pager, an electronic notebook, an electronic dictionary, a calculator, an electronic game device, a word processor, a workstation, a videophone, a crime prevention television monitor, electronic binoculars, a POS terminal, medical devices such as an electronic thermometer, a blood pressure meter, a blood glucose meter, an electrocardiogram measuring device, an ultrasonic diagnosis device, and an electronic endoscope, a fish finder, various measuring devices, instruments of a vehicle, an aircraft, and a ship, moving body control devices such as an automobile control device, an aircraft control device, a railway vehicle control device, and a ship control device, and a flight simulator.

As described above, such an electronic device includes the magnetic element according to the embodiment. Accordingly, effects of the magnetic element such as a low coercive force and a high saturation magnetic flux density can be obtained, and a size of the electronic device can be reduced and an output thereof can be increased.

The amorphous alloy soft magnetic powder, the dust core, the magnetic element, and the electronic device according to the present disclosure are described above based on the preferred embodiment, but the present disclosure is not limited thereto.

For example, in the above embodiment, the dust core is described as an application example of the amorphous alloy soft magnetic powder according to the present disclosure, whereas the application example is not limited thereto, and the amorphous alloy soft magnetic powder may be applied to a magnetic device such as a magnetic fluid, a magnetic shielding sheet, or a magnetic head. Further, the shape of the dust core or the magnetic element is not limited to that shown in the drawings, and may be any shapes.

EXAMPLES

Next, a specific example of the present disclosure will be described.

5. Production of Dust Core

Sample No. 1

First, a raw material was melted in a high-frequency induction furnace and pulverized by a rotary water atomization method to obtain an amorphous alloy soft magnetic powder. At this time, the flow-down amount of the molten metal flowing down from the crucible was 10.0 [kg/min], the pressure of the gas jet was 10.0 MPa, the flow rate of the gas jet was 10.0 [$Nm^3$/min], and the pressure of the cooling liquid was 40 MPa.

Next, classification was performed by a classifier using a mesh having an opening of 150 μm. An alloy composition of the classified amorphous alloy soft magnetic powder is shown in Table 1. For specifying the alloy composition, a solid emission spectrometer, model: SPECTROLAB, type: LAVMB08A, manufactured by SPECTRO, was used.

Next, the particle size distribution of the obtained amorphous alloy soft magnetic powder was measured. This measurement was performed by a microtrac HRA9320-X100, manufactured by Nikkiso Co., Ltd, i.e., a laser diffraction type particle size distribution measuring apparatus. Further, the crystallinity of the obtained amorphous alloy soft magnetic powder was measured by an X-ray diffractometer. Measurement results are shown in Table 1.

Next, the obtained amorphous alloy soft magnetic powder was heated at 360° C. for 15 minutes in a nitrogen atmosphere.

Next, the obtained amorphous alloy soft magnetic powder, an epoxy resin serving as a binder, and toluene serving as an organic solvent were mixed to obtain a mixture. An addition amount of the epoxy resin was 2 parts by mass with respect to 100 parts by mass of the amorphous alloy soft magnetic powder.

Next, the obtained mixture was stirred and then dried for a short time to obtain a massive dried body. Next, the dried body was sieved with a sieve having an opening of 400 μm, and the dried body was pulverized to obtain a granulated powder. The obtained granulated powder was dried at 50° C. for 1 hour.

Next, the obtained granulated powder was filled in a mold, and a molded product was obtained based on the following molding conditions.

Molding Conditions

Molding method: press molding
Shape of molded product: ring shape
Dimensions of molded product: outer diameter: 14 mm, inner diameter: 8 mm, thickness: 3 mm
Molding pressure: 3 t/$cm^2$ (294 MPa)

Next, the molded product was heated in an air atmosphere at a temperature of 150° C. for 0.50 hours to cure the binder. Accordingly, a dust core was obtained.

Samples No. 2 to 16

Dust cores were obtained in the same manner as in Sample No. 1 except that the amorphous alloy soft magnetic powders shown in Table 1 were used.

TABLE 1

| | | | | Composition formula of alloy | | | | Composition ratio in alloy | | | | | | | | | | | |
|---|---|---|---|---|---|---|---|---|---|---|---|---|---|---|---|---|---|---|---|
| | | | | | | | | | | | | M | | | | | | | |
| Sample No. | Example/ Comparative Example | Atomization method | Cooling speed k/s | x — | y — | a — | b — | Fe | Co | Si | B | C | S | P | Sn | Mo | Cu | Nb | Total |
| | | | | | | | | atomic % | | | | | | | | | | | |
| No. 1 | Example | Rotary water | $10^7$ | 0.74 | 0.06 | 16.00 | 0.00 | 62.2 | 21.8 | 1.0 | 15.0 | | | | | | | | 100 |
| No. 2 | Example | Rotary water | $10^7$ | 0.76 | 0.06 | 16.00 | 0.00 | 63.8 | 20.2 | 1.0 | 15.0 | | | | | | | | 100 |
| No. 3 | Example | Rotary water | $10^7$ | 0.79 | 0.06 | 16.00 | 0.00 | 66.4 | 17.6 | 1.0 | 15.0 | | | | | | | | 100 |
| No. 4 | Example | Rotary water | $10^7$ | 0.82 | 0.06 | 16.00 | 0.00 | 68.9 | 15.1 | 1.0 | 15.0 | | | | | | | | 100 |
| No. 5 | Example | Rotary water | $10^7$ | 0.84 | 0.06 | 16.00 | 0.00 | 70.6 | 13.4 | 1.0 | 15.0 | | | | | | | | 100 |
| No. 6 | Example | Rotary water | $10^7$ | 0.79 | 0.03 | 16.00 | 0.00 | 66.4 | 17.6 | 0.5 | 15.5 | | | | | | | | 100 |
| No. 7 | Example | Rotary water | $10^7$ | 0.79 | 0.05 | 16.00 | 0.00 | 66.4 | 17.6 | 0.8 | 15.2 | | | | | | | | 100 |
| No. 8 | Example | Rotary water | $10^7$ | 0.79 | 0.09 | 16.00 | 0.00 | 66.4 | 17.6 | 1.4 | 14.6 | | | | | | | | 100 |
| No. 9 | Example | Rotary water | $10^7$ | 0.79 | 0.06 | 14.00 | 0.00 | 67.9 | 18.1 | 0.8 | 13.2 | | | | | | | | 100 |
| No. 10 | Example | Rotary water | $10^7$ | 0.78 | 0.07 | 18.00 | 0.00 | 64.0 | 18.0 | 1.3 | 16.7 | | | | | | | | 100 |
| No. 11 | Comparative Example | Rotary water | $10^7$ | 0.71 | 0.06 | 16.00 | 0.00 | 59.6 | 24.4 | 1.0 | 15.0 | | | | | | | | 100 |
| No. 12 | Comparative Example | Rotary water | $10^7$ | 0.87 | 0.06 | 16.00 | 0.00 | 73.1 | 10.9 | 1.0 | 15.0 | | | | | | | | 100 |
| No. 13 | Comparative Example | Rotary water | $10^7$ | 0.79 | 0.01 | 16.00 | 0.00 | 66.4 | 17.6 | 0.2 | 15.8 | | | | | | | | 100 |
| No. 14 | Comparative Example | Rotary water | $10^7$ | 0.79 | 0.12 | 16.00 | 0.00 | 66.4 | 17.6 | 1.9 | 14.1 | | | | | | | | 100 |
| No. 15 | Comparative Example | Rotary water | $10^7$ | 0.80 | 0.05 | 10.00 | 0.00 | 72.0 | 18.0 | 0.5 | 9.5 | | | | | | | | 100 |
| No. 16 | Comparative Example | Rotary water | $10^7$ | 0.80 | 0.05 | 21.00 | 0.00 | 63.2 | 15.8 | 1.1 | 20.0 | | | | | | | | 100 |

Samples No. 17 to 29

Dust cores were obtained in the same manner as in Sample No. 1 except that the amorphous alloy soft magnetic powders shown in Table 2 were used.

TABLE 2

| | | | | Composition formula of alloy | | | | Composition ratio in alloy | | | | | | | | | | | |
|---|---|---|---|---|---|---|---|---|---|---|---|---|---|---|---|---|---|---|---|
| | | | | | | | | | | | | M | | | | | | | |
| Sample No. | Example/ Comparative Example | Atomization method | Cooling speed k/s | x — | y — | a — | b — | Fe | Co | Si | B | C | S | P | Sn | Mo | Cu | Nb | Total |
| | | | | | | | | atomic % | | | | | | | | | | | |
| No. 17 | Example | Rotary water | $10^7$ | 0.79 | 0.06 | 16.00 | 0.50 | 66.0 | 17.5 | 1.0 | 15.0 | 0.5 | | | | | | | 100 |
| No. 18 | Example | Rotary water | $10^7$ | 0.79 | 0.06 | 16.00 | 1.00 | 65.6 | 17.4 | 1.0 | 15.0 | 1.0 | | | | | | | 100 |
| No. 19 | Example | Rotary water | $10^7$ | 0.79 | 0.06 | 16.00 | 1.50 | 65.2 | 17.3 | 1.0 | 15.0 | 1.5 | | | | | | | 100 |
| No. 20 | Example | Rotary water | $10^7$ | 0.79 | 0.06 | 16.00 | 1.00 | 65.6 | 17.4 | 1.0 | 15.0 | | 1.0 | | | | | | 100 |
| No. 21 | Example | Rotary water | $10^7$ | 0.79 | 0.06 | 16.00 | 1.00 | 65.6 | 17.4 | 1.0 | 15.0 | | | 1.0 | | | | | 100 |
| No. 22 | Example | Rotary water | $10^7$ | 0.79 | 0.06 | 16.00 | 1.00 | 65.6 | 17.4 | 1.0 | 15.0 | | | | 1.0 | | | | 100 |
| No. 23 | Example | Rotary water | $10^7$ | 0.79 | 0.06 | 16.00 | 1.00 | 65.6 | 17.4 | 1.0 | 15.0 | | | | | 1.0 | | | 100 |
| No. 24 | Example | Rotary water | $10^7$ | 0.79 | 0.06 | 16.00 | 1.00 | 65.6 | 17.4 | 1.0 | 15.0 | | | | | | 1.0 | | 100 |
| No. 25 | Example | Rotary water | $10^7$ | 0.79 | 0.06 | 16.00 | 1.00 | 65.6 | 17.4 | 1.0 | 15.0 | | | | | | | 1.0 | 100 |
| No. 26 | Example | Rotary water | $10^7$ | 0.79 | 0.06 | 16.00 | 1.00 | 65.6 | 17.4 | 1.0 | 15.0 | 0.5 | 0.5 | | | | | | 100 |
| No. 27 | Example | Rotary water | $10^7$ | 0.79 | 0.06 | 16.00 | 1.00 | 65.6 | 17.4 | 1.0 | 15.0 | 0.5 | | 0.5 | | | | | 100 |
| No. 28 | Comparative Example | Rotary water | $10^7$ | 0.79 | 0.06 | 16.00 | 3.00 | 64.0 | 17.0 | 1.0 | 15.0 | 3.0 | | | | | | | 100 |
| No. 29 | Comparative Example | Rotary water | $10^7$ | 0.82 | 0.06 | 16.00 | 3.00 | 67.2 | 14.8 | 0.9 | 14.1 | 2.0 | 1.0 | | | | | | 100 |
| No. 30 | Comparative Example | Water | $10^7$ | 0.79 | 0.05 | 16.00 | 0.00 | 66.4 | 17.6 | 0.8 | 15.2 | | | | | | | | 100 |
| No. 31 | Comparative Example | Water | $10^7$ | 0.79 | 0.06 | 16.00 | 1.00 | 65.6 | 17.4 | 1.0 | 15.0 | 1.0 | | | | | | | 100 |

Sample No. 30

An amorphous alloy soft magnetic powder was produced and a dust core was obtained in the same manner as in Sample No. 1 except that a water atomization method was used instead of the rotary water atomization method. A cooling speed in the water atomization method is as shown in Table 2.

Sample No. 31

A dust core was obtained in the same manner as in Sample No. 30 except that the amorphous alloy soft magnetic powder shown in Table 2 was used.

In Tables 1 and 2, among the amorphous alloy soft magnetic powder of each sample No., those corresponding to the present disclosure are shown as "Examples", and those not corresponding to the present disclosure are shown as "Comparative Examples".

6. Evaluation of Amorphous Alloy Soft Magnetic Powder and Dust Core 6.1. Powder Characteristics of Amorphous Alloy Soft Magnetic Powder An apparent density AD and a tap density TD of the amorphous alloy soft magnetic powder obtained in each of Examples and Comparative Examples were measured. Further, a relative value of the tap density TD when the apparent density AD was set to 100, i.e., a ratio of the tap density to the apparent density was calculated. Measurement results and calculation results are shown in Tables 3 and 4.

6.2. Coercive Force of Amorphous Alloy Soft Magnetic Powder

The coercive force of each of the amorphous alloy soft magnetic powder obtained in Examples and Comparative Examples was measured using the following measuring apparatus. Measurement results are shown in Tables 3 and 4.

Measuring apparatus: vibration sample magnetometer, VSM system, TM-VSM 1230-MHHL, manufactured by Tamakawa Co., Ltd.

6.3. Saturation Magnetic Flux Density of Amorphous Alloy Soft Magnetic Powder

The saturation magnetic flux density of each of the amorphous alloy soft magnetic powder obtained in Examples and Comparative Examples was measured as follows.

First, a true specific gravity ρ of the amorphous alloy soft magnetic powder was measured by a full-automatic gas substitution type densitometer AccuPyc 1330 manufactured by Micromeritics Corporation.

Next, maximum magnetization Mm of the amorphous alloy soft magnetic powder was measured using the vibration sample magnetometer used in 6.2. Next, a saturation magnetic flux density Bs was determined according to the following equation. Calculation results are shown in Tables 3 and 4.

$$Bs=4\pi/10000\times\rho\times Mm$$

6.4. Magnetic Permeability of Dust Core

The magnetic permeability of each of the dust cores obtained in Examples and Comparative Examples was measured based on the following measurement conditions. Measurement results are shown in Tables 3 and 4.

Measurement Conditions of Magnetic Permeability

Measuring apparatus: impedance analyzer, 4194A manufactured by Agilent Technologies, Inc.

Measurement frequency: 100 kHz

The number of turns of windings: 7

Wire diameter of winding: 0.8 mm

TABLE 3

| | | Evaluation result | | | | | | | |
|---|---|---|---|---|---|---|---|---|---|
| Sample No. | Example/ Comparative Example | D50 μm | (D90 − D10)/D50 — | Crystallinity % | Apparent density g/cm$^3$ | Ratio of tap density to apparent density — | Coercive force Oe | Saturation magnetic flux density T | Magnetic permeability (100 kHz) — |
| No. 1 | Example | 28.5 | 2.5 | 50 | 4.55 | 103 | 1.37 | 1.62 | 21.0 |
| No. 2 | Example | 31.0 | 2.4 | 60 | 4.60 | 109 | 1.35 | 1.63 | 21.5 |
| No. 3 | Example | 33.8 | 2.5 | 55 | 4.63 | 110 | 1.34 | 1.65 | 22.0 |
| No. 4 | Example | 35.4 | 2.6 | 55 | 4.61 | 108 | 1.37 | 1.63 | 21.3 |
| No. 5 | Example | 39.3 | 2.1 | 60 | 4.58 | 105 | 1.45 | 1.64 | 20.8 |
| No. 6 | Example | 32.3 | 2.4 | 70 | 4.57 | 107 | 1.40 | 1.63 | 20.1 |
| No. 7 | Example | 34.5 | 2.5 | 55 | 4.63 | 110 | 1.35 | 1.65 | 21.8 |
| No. 8 | Example | 25.4 | 2.7 | 60 | 4.56 | 107 | 1.36 | 1.63 | 21.7 |
| No. 9 | Example | 22.3 | 2.8 | 70 | 4.48 | 105 | 1.52 | 1.61 | 20.0 |
| No. 10 | Example | 17.8 | 3.1 | 70 | 4.47 | 105 | 1.48 | 1.60 | 20.1 |
| No. 11 | Comparative Example | 33.0 | 2.6 | 60 | 4.35 | 102 | 2.31 | 1.25 | 17.8 |
| No. 12 | Comparative Example | 40.0 | 2.2 | 80 | 4.34 | 102 | 3.50 | 1.08 | 18.0 |
| No. 13 | Comparative Example | 25.4 | 2.3 | 60 | 4.56 | 104 | 7.56 | 0.98 | 14.6 |
| No. 14 | Comparative Example | 21.3 | 3.0 | 60 | 4.45 | 106 | 5.42 | 1.54 | 19.5 |
| No. 15 | Comparative Example | 28.0 | 2.3 | 85 | 4.50 | 103 | 2.56 | 1.18 | 18.5 |
| No. 16 | Comparative Example | 34.2 | 2.3 | 70 | 4.43 | 102 | 3.65 | 1.07 | 16.5 |

TABLE 4

| | | Evaluation result | | | | | | | |
|---|---|---|---|---|---|---|---|---|---|
| Sample No. | Example/ Comparative Example | D50 µm | (D90 − D10)/D50 — | Crystallinity % | Apparent density g/cm$^3$ | Ratio of tap density to apparent density — | Coercive force Oe | Saturation magnetic flux density T | Magnetic permeability (100 kHz) — |
| No. 17 | Example | 35.2 | 2.5 | 60 | 4.64 | 110 | 1.33 | 1.66 | 22.8 |
| No. 18 | Example | 34.2 | 2.6 | 50 | 4.63 | 112 | 1.32 | 1.67 | 23.5 |
| No. 19 | Example | 33.5 | 2.6 | 55 | 4.65 | 108 | 1.34 | 1.66 | 23.1 |
| No. 20 | Example | 32.8 | 2.7 | 55 | 4.62 | 110 | 1.34 | 1.65 | 22.1 |
| No. 21 | Example | 28.5 | 2.7 | 60 | 4.61 | 108 | 1.35 | 1.65 | 22.0 |
| No. 22 | Example | 29.5 | 3.1 | 60 | 4.58 | 107 | 1.33 | 1.64 | 21.8 |
| No. 23 | Example | 30.5 | 3.1 | 55 | 4.56 | 107 | 1.34 | 1.65 | 21.7 |
| No. 24 | Example | 28.5 | 2.8 | 55 | 4.66 | 109 | 1.33 | 1.66 | 23.0 |
| No. 25 | Example | 27.4 | 2.6 | 55 | 4.63 | 108 | 1.34 | 1.66 | 23.0 |
| No. 26 | Example | 35.2 | 2.6 | 45 | 4.63 | 114 | 1.31 | 1.68 | 24.1 |
| No. 27 | Example | 33.4 | 3.2 | 45 | 4.66 | 114 | 1.31 | 1.68 | 24.2 |
| No. 28 | Comparative Example | 30.5 | 3.1 | 90 | 4.45 | 102 | 1.96 | 1.41 | 15.6 |
| No. 29 | Comparative Example | 28.5 | 3.2 | 95 | 4.36 | 102 | 2.04 | 1.36 | 14.6 |
| No. 30 | Comparative Example | 34.5 | 3.2 | 100 | 4.33 | 102 | 20.60 | 1.44 | 10.5 |
| No. 31 | Comparative Example | 33.6 | 2.8 | 100 | 4.35 | 106 | 18.50 | 1.36 | 11.6 |

As is clear from Tables 3 and 4, it was confirmed that the amorphous alloy soft magnetic powder obtained in each of Examples achieved both a low coercive force and a high saturation magnetic flux density. In particular, it was confirmed that by increasing the cooling speed, the crystallinity can be lowered, and a low coercive force and a high magnetic permeability can be obtained. Further, it was confirmed that the amorphous alloy soft magnetic powder obtained in each of Examples had a relatively narrow particle size distribution and a relatively large ratio of the tap density to the apparent density.

What is claimed is:

1. An amorphous alloy soft magnetic powder, comprising: a composition represented by the following formula:

$$(Fe_xCo_{(1-x)})_{(100-(a+b))}(Si_yB_{(1-y)})_aM_b$$

[where M is at least one selected from the group consisting of C, S, P, Sn, Mo, Cu, and Nb, $0.73 \leq x \leq 0.85$, $0.02 \leq y \leq 0.10$, $13.0 \leq a \leq 19.0$, and $0 \leq b \leq 2.0$], wherein a coercive force of the amorphous alloy soft magnetic powder is 24 [A/m] or more (0.3 [Oe] or more) and 199 [A/m] or less (2.5 [Oe] or less), and a saturation magnetic flux density of the amorphous alloy soft magnetic powder is 1.60 [T] or more and 2.20 [T] or less.

2. The amorphous alloy soft magnetic powder according to claim 1, wherein a magnetic permeability of the amorphous alloy soft magnetic powder at a measurement frequency of 100 kHz is 20.0 or more.

3. The amorphous alloy soft magnetic powder according to claim 1, wherein when an apparent density [g/cm$^3$] of the amorphous alloy soft magnetic powder is 100, a tap density [g/cm$^3$] of the amorphous alloy soft magnetic powder is 103 or more and 120 or less.

4. The amorphous alloy soft magnetic powder according to claim 1, wherein an average particle diameter of the amorphous alloy soft magnetic powder is 5.0 µm or more and 60.0 µm or less.

5. The amorphous alloy soft magnetic powder according to claim 1, wherein a crystallinity of the amorphous alloy soft magnetic powder is 70% or less.

6. A dust core comprising:

the amorphous alloy soft magnetic powder according to claim 1.

7. A magnetic element comprising:

the dust core according to claim 6.

8. An electronic device comprising:

the magnetic element according to claim 7.

* * * * *